(12) United States Patent
Sekiguchi

(10) Patent No.: US 10,875,567 B2
(45) Date of Patent: *Dec. 29, 2020

(54) STEERING DEVICE

(71) Applicant: YAMADA MANUFACTURING CO., LTD., Kiryu (JP)

(72) Inventor: Toru Sekiguchi, Kiryu (JP)

(73) Assignee: YAMADA MANUFACTURING CO., LTD., Kiryu (JP)

(*) Notice: Subject to any disclaimer, the term of this patent is extended or adjusted under 35 U.S.C. 154(b) by 101 days.

This patent is subject to a terminal disclaimer.

(21) Appl. No.: 16/296,689

(22) Filed: Mar. 8, 2019

(65) Prior Publication Data

US 2019/0276069 A1 Sep. 12, 2019

(30) Foreign Application Priority Data

Mar. 12, 2018 (JP) .................................. 2018-43964

(51) Int. Cl.
B62D 1/185 (2006.01)
B62D 1/184 (2006.01)

(52) U.S. Cl.
CPC ............. B62D 1/185 (2013.01); B62D 1/184 (2013.01)

(58) Field of Classification Search
CPC ........ B62D 1/185; B62D 1/184; B62D 7/224; B62D 1/16
USPC .......................................................... 74/493
See application file for complete search history.

(56) References Cited

U.S. PATENT DOCUMENTS

| 6,283,867 | B1* | 9/2001 | Aota | F16D 3/68 464/158 |
| 6,733,039 | B2* | 5/2004 | Honda | B62D 1/16 267/141.2 |
| 7,316,418 | B2* | 1/2008 | Goto | B62D 7/224 280/779 |
| 9,592,847 | B2* | 3/2017 | Hansen | F16D 3/76 |
| 2002/0190450 | A1* | 12/2002 | Honda | B62D 7/224 267/141 |
| 2012/0004043 | A1* | 1/2012 | Lehmann | F16D 3/68 464/93 |
| 2014/0373663 | A1* | 12/2014 | Hahn | B62D 1/184 74/493 |
| 2015/0217804 | A1* | 8/2015 | Moriyama | F16F 15/1245 180/444 |

(Continued)

FOREIGN PATENT DOCUMENTS

JP 2004-322688 11/2004

*Primary Examiner* — James A English
*Assistant Examiner* — Kurtis Nielson
(74) *Attorney, Agent, or Firm* — Rankin, Hill & Clark LLP

(57) ABSTRACT

An inner shaft of a steering device and an outer shaft thereof are provided so as to be movable relative to each other via a movement mechanism along an axial line. The inner shaft includes a first abutting member and a second abutting member which are disposed along the axial line and which have different hardness. The outer shaft includes a torque transmitting portion which abuts either the first abutting member or the second abutting member only upon operation given to the movement mechanism, and which is capable of transmitting torque with either the one abutting member only. The movement mechanism includes a movement mechanism main body which is provided on the main pipe and which moves along the axial line.

3 Claims, 9 Drawing Sheets

(56) References Cited

U.S. PATENT DOCUMENTS

2015/0298733 A1* 10/2015 Moriyama ................ F16H 1/16
                                                       180/444
2019/0276068 A1* 9/2019 Sekiguchi .............. B62D 1/185

* cited by examiner

STEERING DEVICE

FIELD OF THE INVENTION

The present disclosure relates to a steering device which transmits steering torque of a steering wheel to wheels.

BACKGROUND

A driver of a vehicle drives the vehicle by turning a steering wheel. A steering effort to the steering wheel is transmitted to wheels via a steering device. Turning the wheels from side to side defines the traveling direction of the vehicle. JP 2004-322688 A discloses a technology that is such a steering device.

The steering device disclosed in JP 2004-322688 A includes a steering column fastened to a vehicular body, a main shaft which is supported by the steering column and which has an upper end to which a steering wheel is fastened, an intermediate shaft connected to the lower end of the main shaft via a joint, and a gear box connected to the lower end of this intermediate shaft via a joint.

Turning the steering wheel causes tie rods to be displaced from side to side via the gear box, and thus the wheels are turned.

SUMMARY OF THE INVENTION

Meanwhile, during the drive of the vehicle, vibration etc., due to unevenness of a road surface may be transmitted to the steering wheel from the wheels. The preferable steering feeling to be transmitted to the driver when the steering wheel is turned varies depending on drivers. For example, there is a driver who prefers further transmission of the feeling on the unevenness of a road surface, while there is a driver who prefers a feeling not likely to be transmitted from the unevenness of the road surface. If the feeling to be transmitted to a driver when the steering wheel is turned is selectable, more drivers can drive comfortably, thus preferable. Moreover, it is further preferable if an operation to select the steering feeling should be facilitated.

An objective of the present disclosure is to provide a steering device which enables selection of a steering feeling and which facilitates an operation to select the steering feeling.

A steering device according to the present disclosure comprises:

a main pipe formed in a cylindrical shape;

an inner shaft which is rotatably supported by the main pipe and which has one end to which a steering wheel is fastened; and an outer shaft which partially covers the inner shaft and which is rotatable together with the inner shaft, wherein the inner shaft and the outer shaft are provided so as to be movable relative to each other via a movement mechanism along an axial line, wherein the inner shaft comprises a first abutting member and a second abutting member which are disposed along the axial line and which have different hardness, wherein the outer shaft comprises a torque transmitting portion which abuts either the first abutting member or the second abutting member only upon operation given to the movement mechanism, and which is capable of transmitting torque with either the one abutting member only, and wherein the movement mechanism comprises a movement mechanism main body which is provided on the main pipe and which moves along the axial line.

According to the present disclosure, the torque transmitting portion is provided which abuts either the first abutting member or the second abutting member only upon operation given to the movement mechanism, and which is capable of transmitting torque with either the one abutting member only. By operating the movement mechanism, the torque transmitting portion abuts either the first abutting member or the second abutting member. At this time, only the abutting member abutting the torque transmitting portion can transmit torque therewith. That is, the abutting member that does not abut the torque transmitting portion cannot transmit the torque therewith. Moreover, the first abutting member and the second abutting member have different hardness. When the torque is transmitted via the first abutting member and when the torque is transmitted via the second abutting member, the feeling to be felt by a driver when turning the steering wheel differs. Selectin of such a feeling can be carried out by operating the movement mechanism. Hence, the steering device is provided which enables selection of the steering feeling.

In addition, the movement mechanism is supported by the main pipe that supports the steering wheel. The steering wheel is placed at the nearby location to a driver. Accordingly, placement of the movement mechanism at the nearby location to the steering wheel facilitates the driver to operate the movement mechanism.

DETAILED DESCRIPTION OF THE EMBODIMENTS

Embodiments of the present disclosure will be described below with reference to the accompanying figures.

EMBODIMENTS

Figure 1:
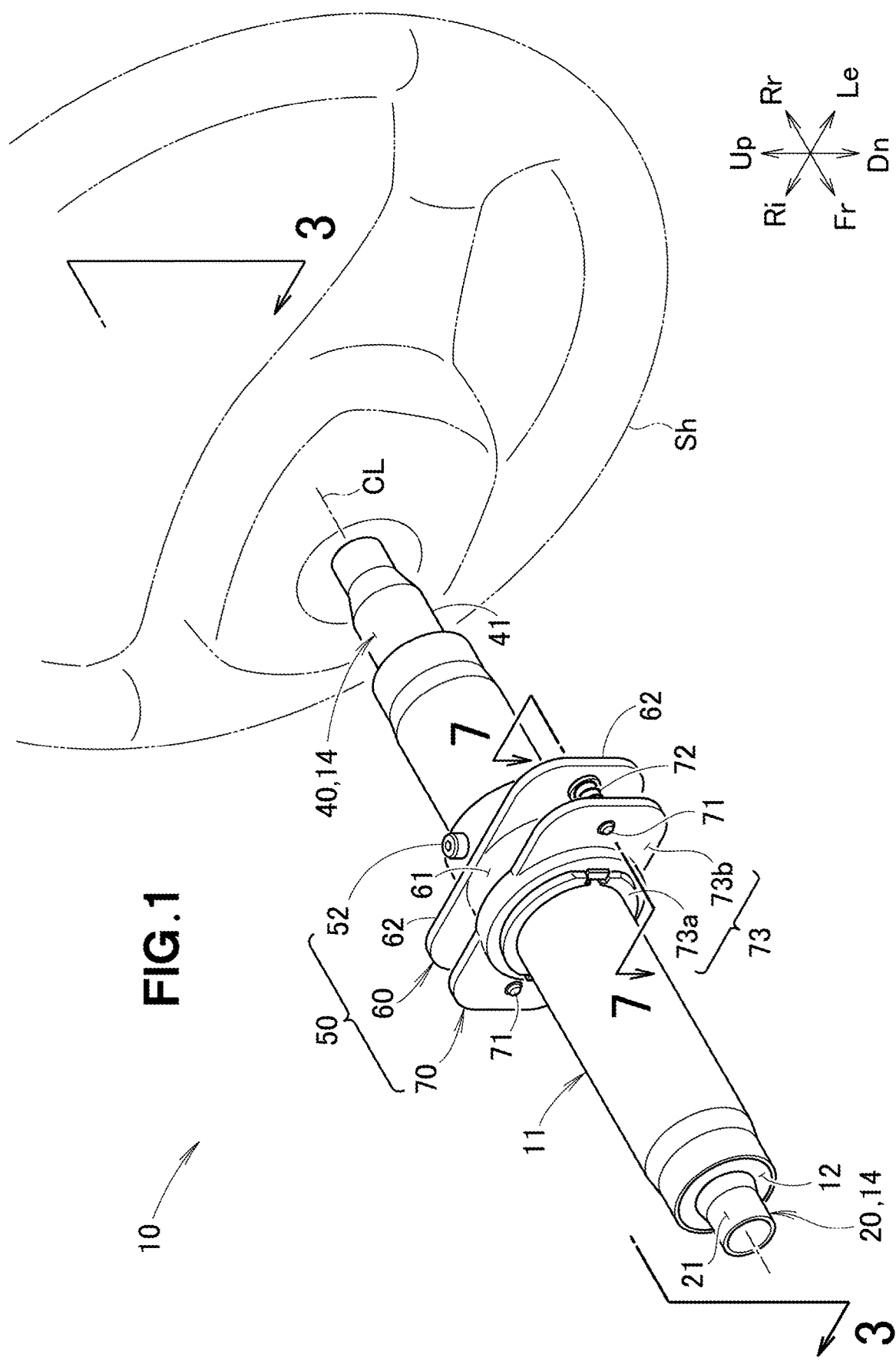
FIG. 1 is a perspective view of a steering device according to an embodiment.

With reference to FIG. 1, a steering device 10 is mounted on the front part of a vehicle. In the following description, terms right and left mean the right and left sides with reference to a person in the vehicle (e.g., driver), and terms front and rear mean the front and rear sides with reference to the traveling direction of the vehicle. In the figures, references Fr and Rr indicate front and rear, references Le and Ri indicate left and right with reference to the person in the vehicle, and references Up and Dn indicate up and down, respectively.

Figure 2:
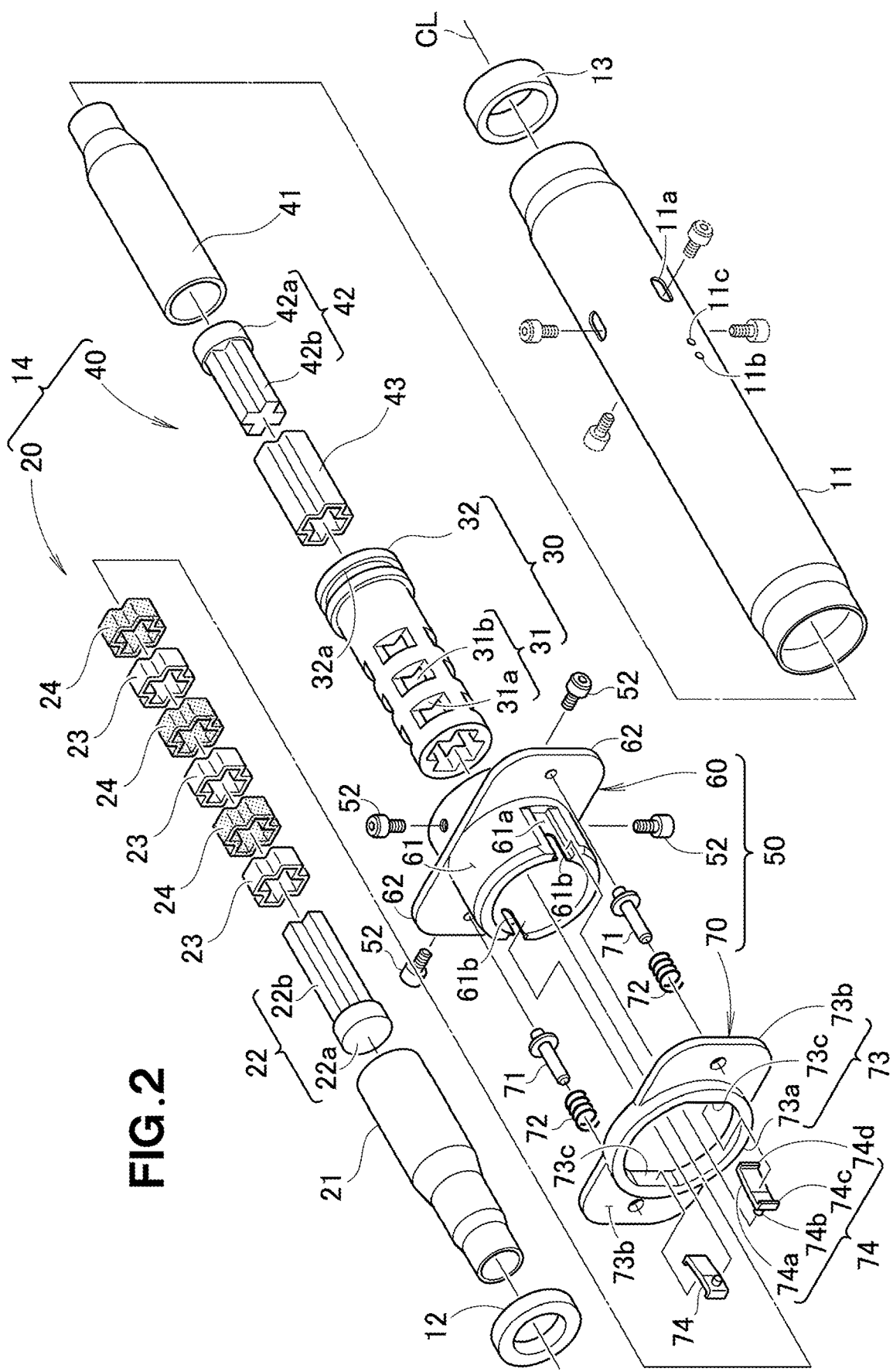
FIG. 2 is an exploded perspective view of the steering device illustrated in FIG. 1.
Figure 3:
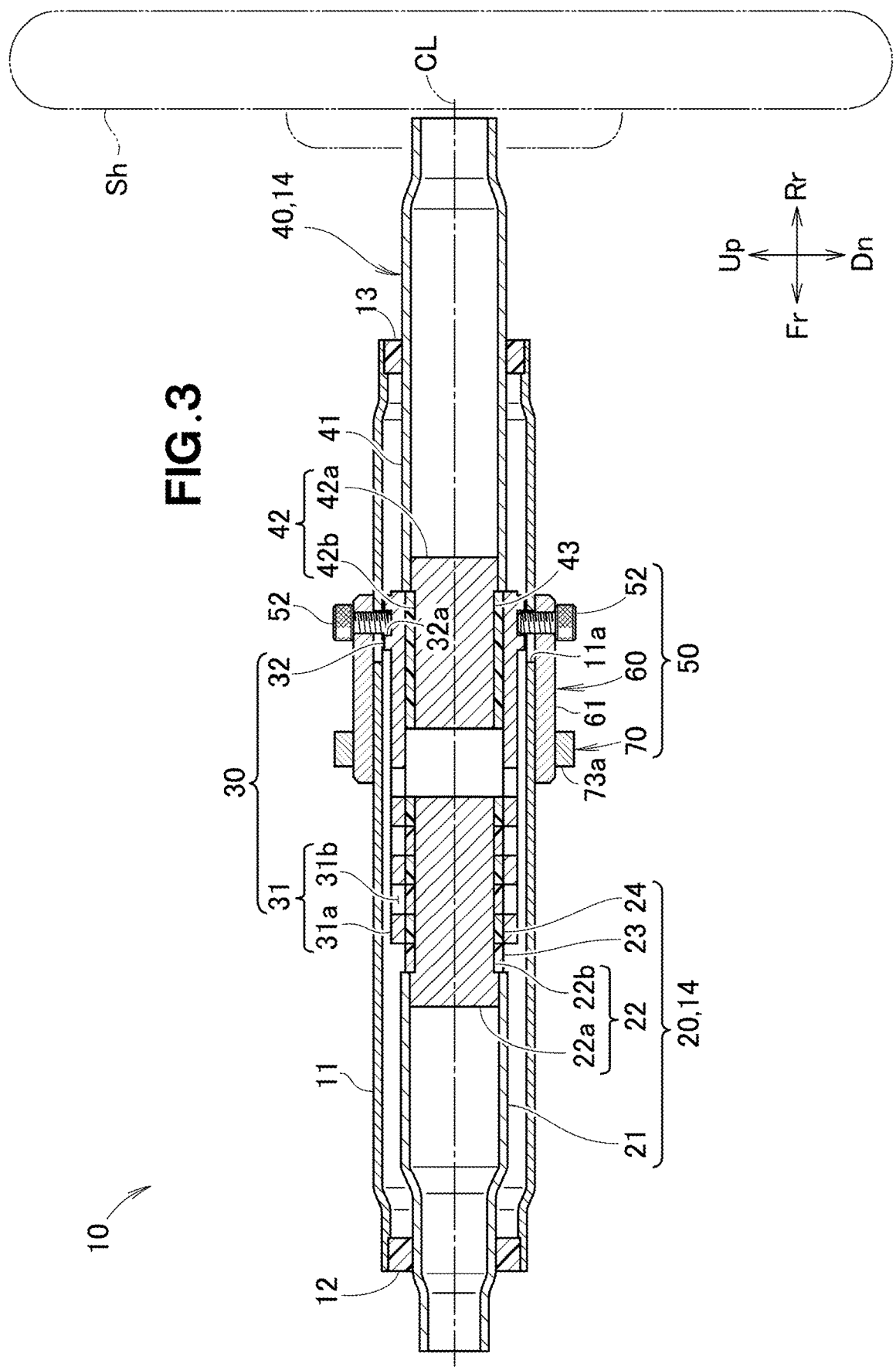
FIG. 3 is a cross-sectional view taken along a line 3-3 in FIG. 1.

With reference to FIG. 2 and FIG. 3, the steering device 10 includes a main pipe 11 formed cylindrically, bearings 12 and 13 that are resin rings provided at both ends, respectively, of the main pipe 11 in the back-and-forth direction, an inner shaft 14 supported by the main pipe 11 so as to be rotatable via the bearings 12 and 13, an outer shaft 30 formed cylindrically and covering the inner shaft 14, and a movement mechanism 50 which is provided on the outer circumference of the outer shaft 30 and which moves this outer shaft 30 back and forth along an axial line CL.

The main pipe 11 formed of metal has elongated holes 11a opened in an elongated circular shape at a portion covering the outer shaft 30, and two lock holes 11b and 11c opened ahead of the elongated holes 11a and to lock the movement mechanism 50 so as to be unmovable. Both ends of the main pipe 11 are formed so as to have a smaller diameter than those of other components.

The elongated holes 11a are each in an elongated circular shape along the axial line CL, and the four elongated holes are formed 90 degrees by 90 degrees in the circumferential direction.

The lock holes 11b and 11c are each formed in a circular shape, and are formed at two locations, 180 degrees by 180 degrees in the circumferential direction. The two lock holes 11b and 11c are located ahead of the elongated holes 11a.

The inner shaft 14 includes a first inner shaft 20 provided at one end (front end) of the main pipe 11, and a second inner shaft 40 which is provided at the other end (rear end) of the main pipe 11 and which has an end to which a steering wheel Sh that is turned by a driver is fastened. The first inner shaft 20 and the second inner shaft 40 are separated from each other.

The first inner shaft 20 includes a first inner shaft cylindrical member 21 formed cylindrically and fitted in the front bearing 12, a first inner shaft shank member 22 fitted in the rear end of this first inner shaft cylindrical member 21, and first and second abutting member 23 and 24 fitted in the first inner shaft shank member 22, arranged three by three and alternately provided along the axial line CL.

The first inner shaft cylindrical member 21 is formed in a shape that increases diameter step by step from the front part to the rear part.

The first inner shaft shank member 22 formed of metal has a base 22a which is formed in a disk shape and which is fitted in the first inner shaft cylindrical member 21, and an abutting member support 22b which is integrally formed with this base 22a, and is formed in a substantially X-shape with reference to a cross section perpendicular to the axial line CL.

Figure 4:
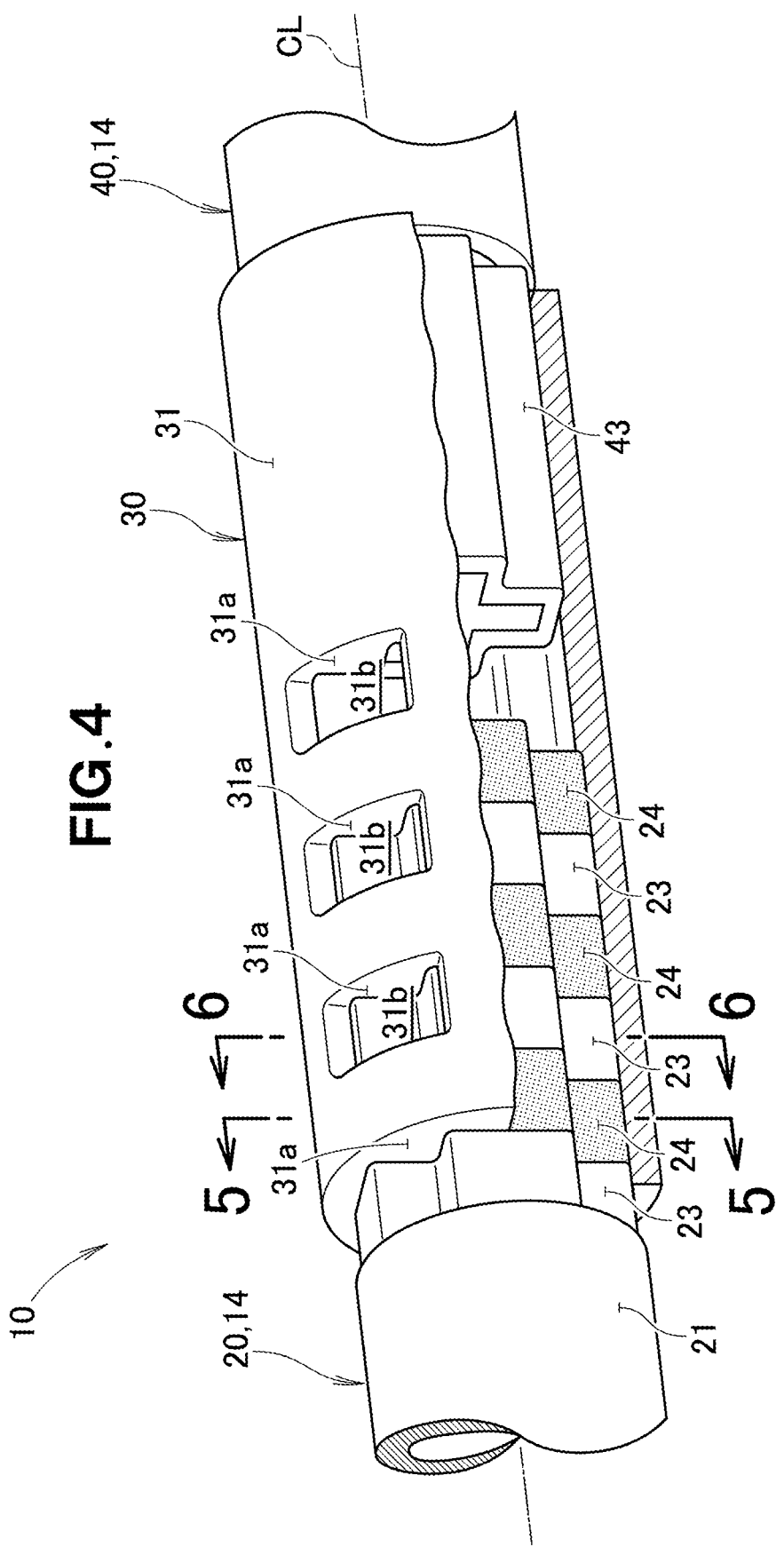
FIG. 4 is a major-component perspective view of the steering device illustrated in FIG. 1.

With reference to FIG. 4, the first abutting member 23 and the second abutting member 24 are each arranged at least one by one. Regarding the arrangement of the first abutting member 23 and the second abutting member 24, such an arrangement may start from the first abutting member 23, and can also start from the second abutting member 24. That is, the first abutting member 23 and the second abutting member 24 may be arranged in an inverted sequence from the illustrated sequence in the figure.

Figure 5:
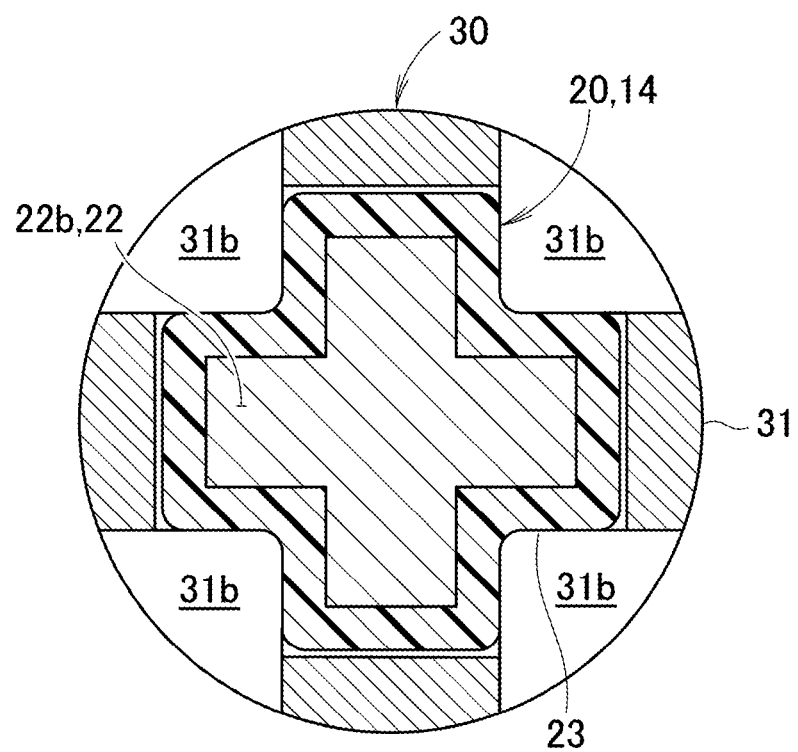
FIG. 5 is a cross-sectional view taken along a line 5-5 in FIG. 4.
Figure 6:
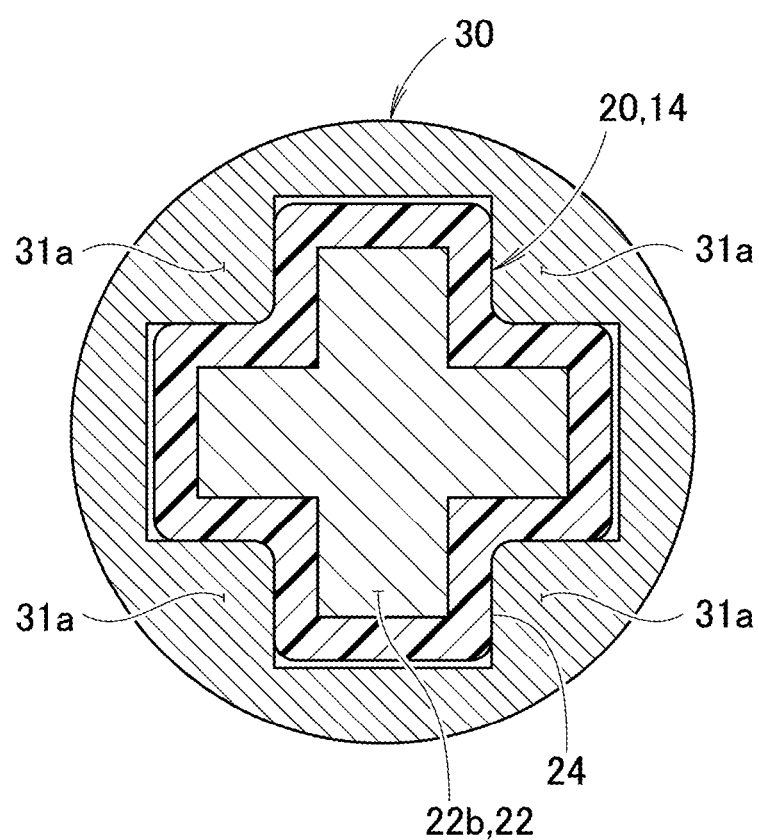
FIG. 6 is a cross-sectional view taken along a line 6-6 in FIG. 4.

With reference to FIG. 5 and FIG. 6, the first abutting member 23 and the second abutting member 24 are formed in the same shape.

The first abutting member 23 is formed of a hard resin, and is formed in a substantially X-shape along the outer circumference of the abutting member support 22b.

The second abutting member 24 is formed of rubber and is formed in a substantially X-shape along the outer circumference of the abutting member support 22b.

With reference to FIG. 2 and FIG. 3, the second inner shaft 40 includes a second inner shaft cylindrical member 41 which is formed in a cylindrical shape and which is fitted in the rear bearing 13, a second inner shaft shank member 42 fitted in the front end of this second inner shaft cylindrical member 41, and a second inner shaft abutting member 43 which is fitted in this second inner shaft shank member 42, and which is extended along the axial line CL.

The second inner shaft cylindrical member 41 is formed so as to increase the diameter step by step from the rear part toward the front part.

The second inner shaft shank member 42 formed of metal may be the same as the first inner shaft shank member 22. The second inner shaft shank member 42 formed of metal has a base 42a which is fitted in the second inner shaft cylindrical member 41 and which is formed in a disk shape, and an abutting member support 42b which is integrally formed with this base 42a and which is formed in a substantially X-shape with reference to the cross section perpendicular to the axial line CL.

The second inner shaft abutting member 43 is formed of a hard resin, and is formed in a substantially X-shape along the outer circumference of the abutting member support 42b. The second inner shaft abutting member 43 is formed in the same shape as those of the first abutting member 23 and the second abutting member 24 with reference to the cross section perpendicular to the axial line CL. The second inner shaft abutting member 43 abuts the inner circumference surface of the outer shaft 30 formed in a shape along the second inner shaft abutting member 43. This enables transmission of torque from the second inner shaft abutting member 43 to the outer shaft 30.

Note that the second inner shaft abutting member 43 may be formed attachably and detachably relative to the second inner shaft shank member 42, or may be formed integrally with the second inner shaft shank member 42 by insert molding.

The outer shaft 30 includes an outer shaft body 31 that surrounds the circumference edges of the first abutting member 23 and second abutting member 24, and an outer shaft large diameter portion 32 which is integrally formed with the rear end of this outer shaft body 31 and which has a larger diameter than that of the outer shaft body 31.

With reference to FIG. 4 to FIG. 6, the outer shaft body 31 includes torque transmitting portions 31a which are each formed in a shape along the outer circumference of the second abutting member 24 and capable of transmitting torque to the second abutting member 24, and outer shaft holes 31b which are each formed in the location near the respective torque transmitting portion 31a and which are opened so as not to transmit torque to the first abutting member 23. The torque transmitting portions 31a and the outer shaft holes 31b are formed alternately along the axial line CL.

The torque transmitting portion 31a may be considered as being formed in a substantially X-shape so as to allow the second abutting member 24 to be engaged therewith.

When the steering wheel Sh (see FIG. 3) is turned, the outer shaft 30 is rotated via the second inner shaft 40 (see FIG. 3). This torque is transmitted to the second abutting members 24 via the torque transmitting portions 31a, and the first inner shaft 20 is rotated. However, no torque is transmitted to the first abutting member 23.

With reference to FIG. 2 and FIG. 3, the outer shaft large diameter portion 32 includes an outer shaft groove 32a which is continuous by 360 degrees in the circumferential direction and which is formed in a groove shape.

Figure 7:
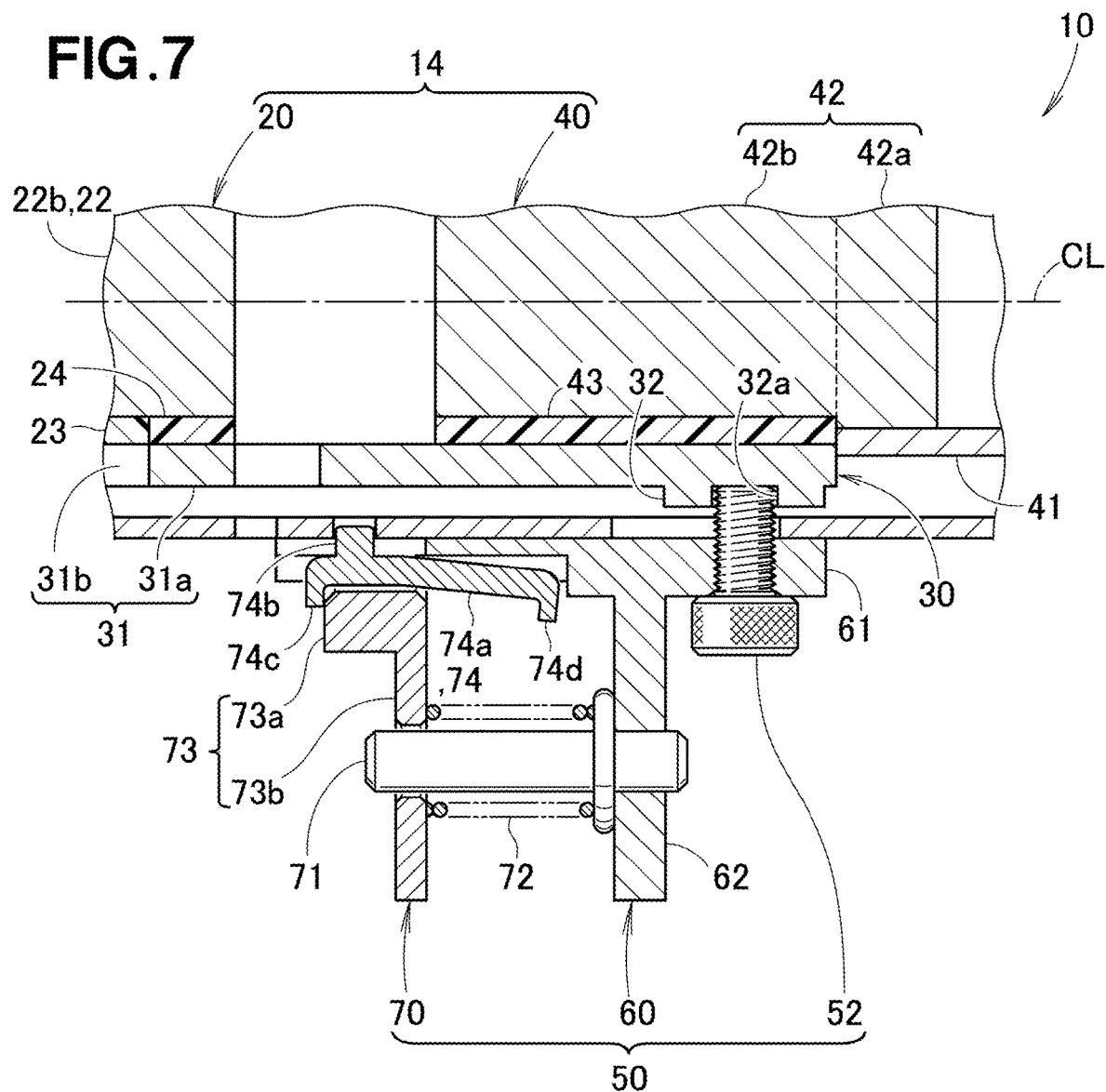
FIG. 7 is a cross-sectional view taken along a line 7-7 in FIG. 1.

With reference to FIG. 2 and FIG. 7, the movement mechanism 50 includes a movement mechanism body 60 which is provided along the outer circumference of the main pipe 11 and which is movable along the axial line CL, coupling members 52 which are each fitted in this movement mechanism body 60 and which have respective tips fitted in the outer shaft groove 32a, and a lock mechanism 70 to suppress a relative displacement of the inner shaft 20 and of the outer shaft 30 in the direction of the axial line CL.

The movement mechanism body 60 includes a movement mechanism cylindrical portion 61 formed in a cylindrical shape, and movement mechanism extended portions 62 and 62 which are each formed in a tabular shape and extended in the horizontal direction from this movement mechanism cylindrical portion 61.

The movement mechanism cylindrical portion 61 is provided with recesses 61a at the front part and at the right and left parts, respectively, concaved along the axial line CL. Respective slits 61b are formed in the respective bottoms of the recesses 61a from the front side along the axial line CL.

Each coupling member 52 passes completely through the movement mechanism main body 60 and the lock hole 11b, and has the tip reaching the outer shaft groove 32a. The four coupling members 52 are attached by 90 degrees by 90 degrees in the circumferential direction to the movement mechanism cylindrical portion 61.

The lock mechanism 70 includes support pins 71 and 71 which are fitted in the right and left movement mechanism extended portions 62, respectively, and which extend along the axial line CL, springs 72 and 72 provided on the respective support pins 71 and 71, a lock actuator 73 which is pushed in a direction apart from the movement mechanism main body 60 by these springs 72 and 72 and which is to change a condition between a locked condition and an unlocked condition, and right and left locking members 74 and 74 which abut the lock actuator 73 and which move forward or backward relative to the lock holes 11b in accordance with an operation given to the lock actuator 73.

The lock actuator 73 includes a lock actuator body 73a that is movable along the outer circumference of the movement mechanism cylindrical portion 61, and lock actuator extended portions 73b and 73b which are extended in the horizontal direction from the lock actuator body 73a and which receive the springs 72 and 72, respectively.

The lock actuator body 73a is formed in a substantially ring shape, and has the right and left inner circumference surfaces formed in a flat shape. The portions formed in the flat shape are locking member abutting portions 73c which abut the locking member 74.

Each locking member 74 includes a lock member body 74a which is retained in the recess 61a and which is formed in a circular arc shape, a lock member protrusion 74b which protrudes from this lock member body 74a toward the outer shaft 30, and which can be fitted in the lock hole 11b, and actuator stoppers 74c and 74d which are extended from the front end the lock member body 74a and the rear end thereof and which restrict a displacement amount of the lock actuator 73.

Next, an action of the steering device 10 will be described below. A driver can change a steering feeling by moving the outer shaft 30 back and forth.

With reference to FIG. 7, in the state illustrated in FIG. 7, the torque transmitting portions 31a abut the respective second abutting members 24. That is, the torque of the outer shaft 30 is transmitted to the second abutting members 24 (first inner shaft 20) via the respective torque transmitting portions 31a.

In contrast, vibration, etc., input to the wheels from the unevenness of the road surface is transmitted to the torque transmitting portions 31a via the respective second abutting members 24. The vibration, etc., transmitted to the torque transmitting portions 31a is transmitted to the steering wheel Sh (see FIG. 3) via the outer shaft 30 and the second inner shaft 40. The steering feeling to be felt by the driver when turning the steering wheel Sh is affected by the second abutting members 24.

The driver can change the steering feeling to be transmitted via the steering wheel Sh (see FIG. 3). The driver operates the torque transmitting portions 31a to be in contact with the first abutting member 23. First of all, the driver pushes the lock actuator 73 toward the lock actuator extended portions 62 against the spring forces by the springs 72.

Figure 8A:
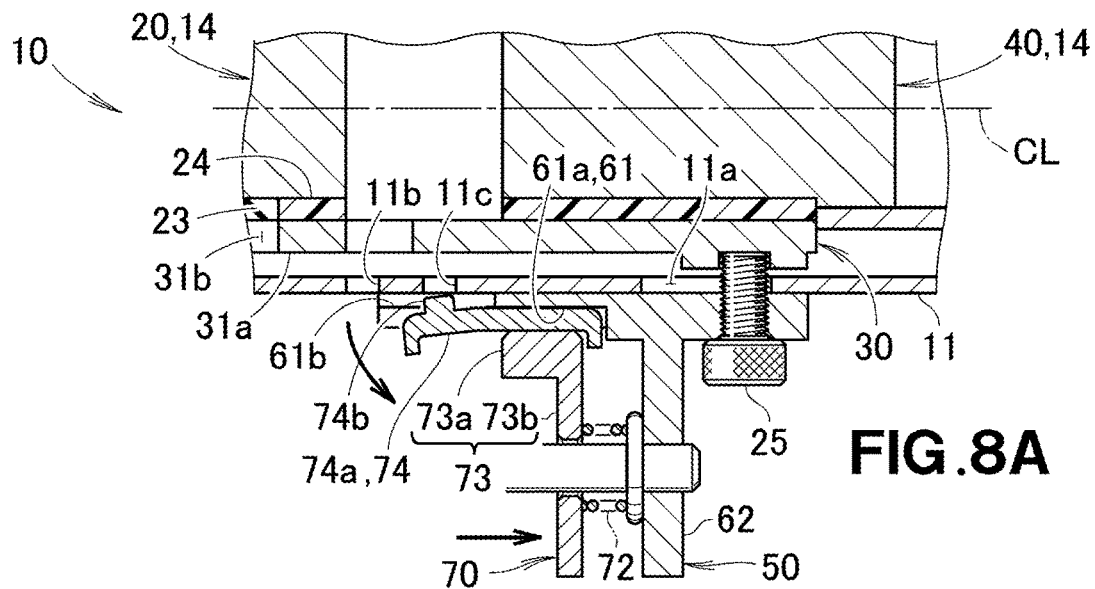
FIG. 8A is a diagram for explaining an action when a lock actuator is displaced backwardly.

With reference to FIG. 8A, the lock member body 74a is formed in a circular arc shape. The lock actuator 73 is abutting the lock member body 74a. By displacing the lock actuator 73 backwardly, the rear ends of the respective lock member bodies 74a are pushed against the respective bottoms of the recesses 61a, and the respective front ends are lifted up. When the front ends of the respective lock member bodies 74a are lifted up, the locking member protrusions 74b are released from the respective lock holes 11c located rearwardly. Hence, the locked condition is canceled and it becomes an unlocked condition.

Figure 8B:
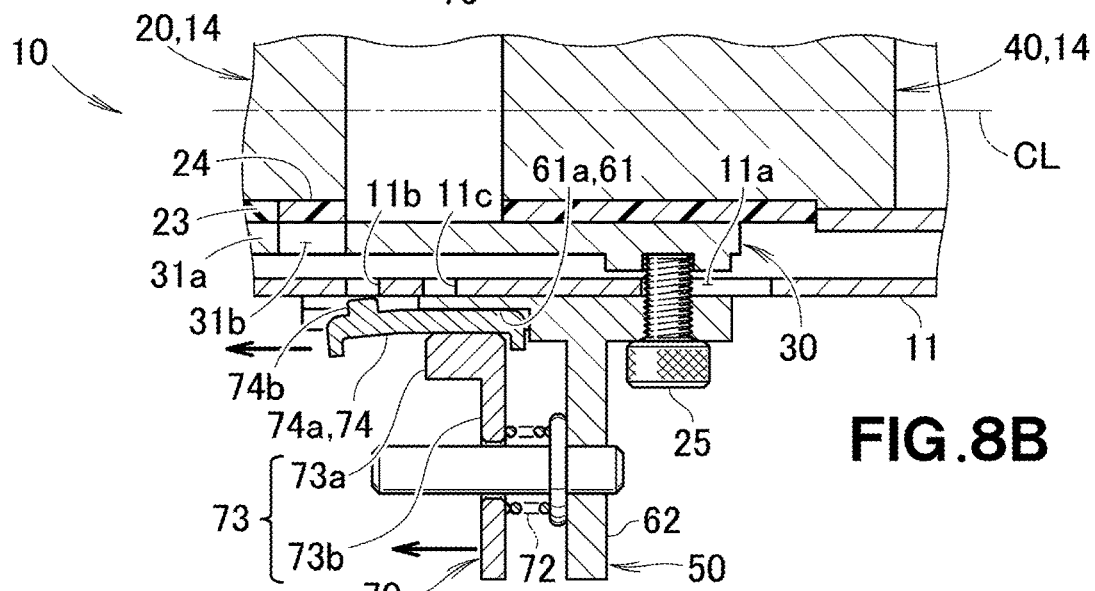
FIG. 8B is a diagram for explaining an action when the lock actuator and a movement mechanism extended portion is pushed forwardly.

With reference to FIG. 8B, the driver pushes out forwardly the lock actuator 73 and the movement mechanism extended portions 62 with the lock actuator 73 being pushed toward the movement mechanism extended portions 62. The driver keeps pushing out forwardly the lock actuator 73 and the movement mechanism extended portions 62 until the coupling members 52 contact the front ends of the respective elongated holes 11a. That is, the front end of each elongated hole 11a restricts the maximum forward movement of the outer shaft 30. Moreover, the rear end of each elongated hole 11a restricts the maximum rearward movement of the outer shaft 30.

Figure 8C:
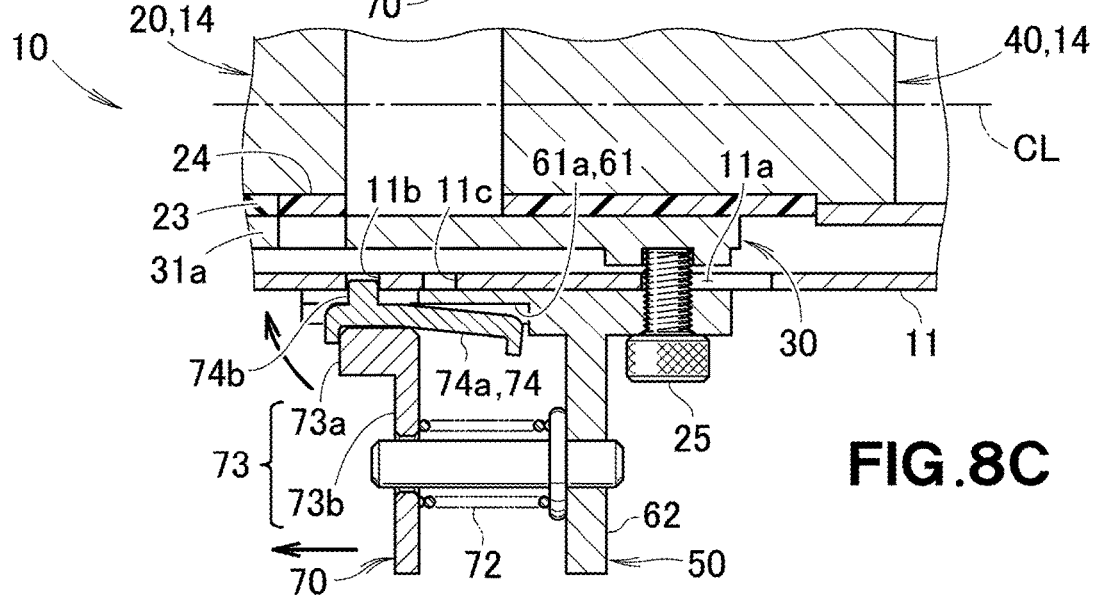
FIG. 8C is a diagram for explaining when a hand is released from the lock actuator.

With reference to FIG. 8C, the driver releases a hand from the lock actuator 73 after the coupling members 52 contact the respective front ends of the elongated holes 11a. The lock actuator 73 is displaced forwardly by the spring forces of the springs 72. Forward displacement of the lock actuator 73 causes the front ends of the respective lock member bodies 74a to be pushed against the main pipe 11, and thus the respective rear ends are lifted up. When the front ends of the respective lock member bodies 74a are pushed against the main pipe 11, the locking member protrusions 74b enter the respective lock holes 11b located forwardly. This achieves the locked condition that restricts the back-and-forth movement of the outer shaft 30.

Figure 9:
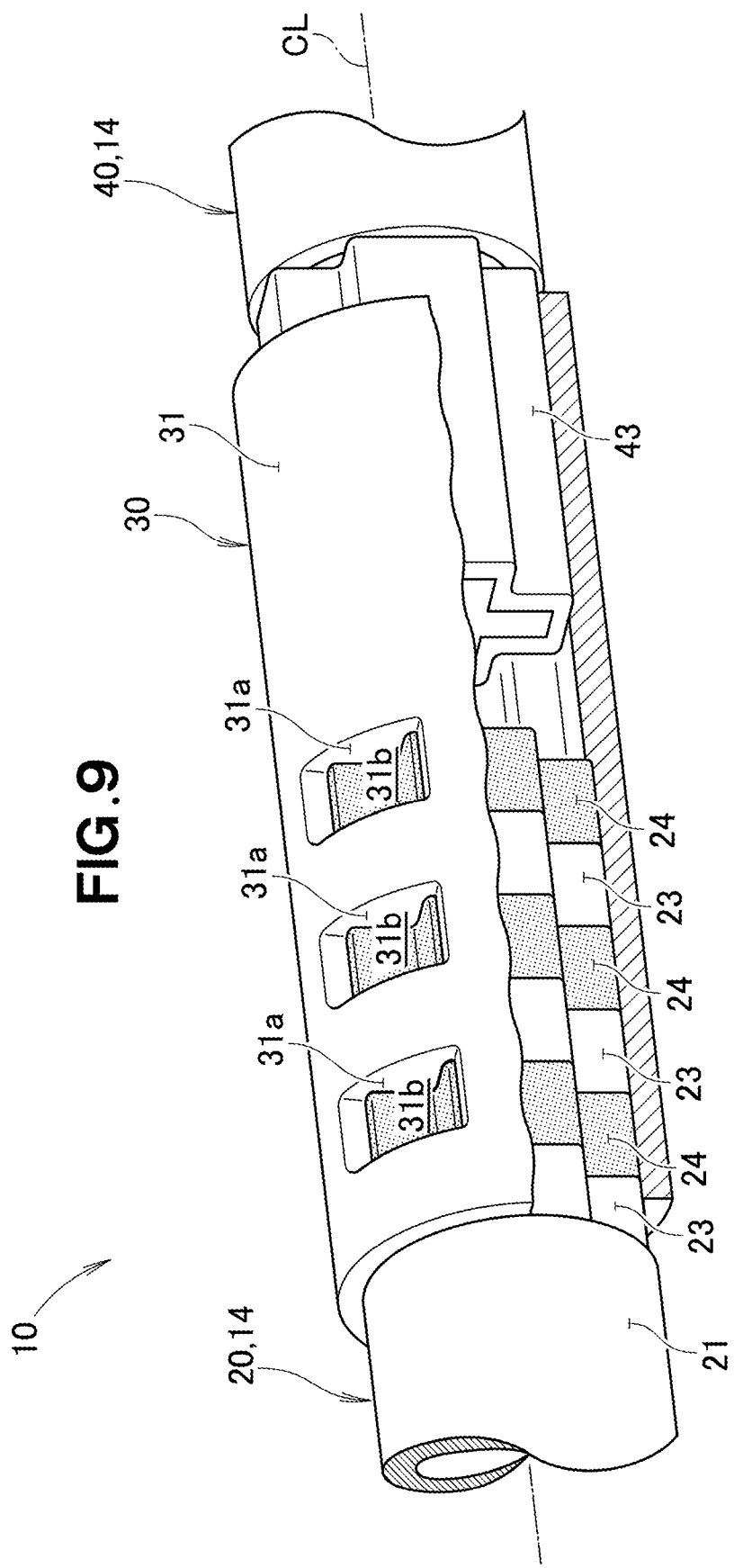
FIG. 9 is a diagram for explaining an action of the steering device illustrated in FIG. 1.

With reference to FIG. 9, forward displacement of the outer shaft 30 causes the torque transmitting portions 31a to abut the respective first abutting members 23. In this case, the torque from the outer shaft 30 is transmitted to the first abutting members 23, and is not transmitted to the second abutting members 24.

In contrast, vibration, etc., input to the wheels from the unevenness of the road surface is transmitted to the torque transmitting portions 31a via the respective first abutting members 23. The vibration, etc., transmitted to the torque transmitting portions 31a is transmitted to the steering wheel Sh (see FIG. 3) via the outer shaft 30 and the second inner shaft 40. The steering feeling to be felt by the driver when turning the steering wheel Sh is affected by the first abutting members 23.

Since the first abutting member 23 (e.g., hard resin) and the second abutting member 24 (e.g., rubber) are formed of different materials, the steering feeling changes depending on the member with which the torque transmitting portion 31a abuts.

The steering device 10 as described above achieves the following effects.

With reference to FIG. 4 and FIG. 9, the steering device 10 includes the torque transmitting portions 31a that abut either the respective first abutting members 23 or the respective second abutting members 24 in accordance with an operation to the movement mechanism 50 (see FIG. 3). The torque transmitting portion 31a can transmit torque only with either abutting member (e.g., second abutting member 24 in FIG. 4). The torque transmitting portions 31a are caused to abut either the respective first abutting members 23 or the respective second abutting members 24 by operating the movement mechanism 50. At this time, only the abutting member that is abutting the torque transmitting portion 31a can transmit the torque thereto. That is, the other abutting member (e.g., the first abutting member 23 in FIG. 4) cannot transmit the torque to the torque transmitting portion 31a. Moreover, the first abutting member 23 and the second abutting member 24 have different hardness. When the torque is transmitted via the first abutting members 23 (see FIG. 9), and when the torque is transmitted via the second abutting members 24 (see FIG. 4), the feeling to be transmitted to the driver when turning the steering wheel Sh (see FIG. 1) differs. The selection of these feelings can be carried out by operating the movement mechanism 50. Accordingly, the steering device 10 can be provided which enables selection of the steering feeling.

In particular, the selection of the steering feeling is enabled by a simple mechanical structure. Although it is the inexpensive steering device 10 which does not need expensive components, such as a motor and a control unit, the steering feeling can be selected as appropriate, thus preferable.

With reference to FIG. 1, the movement mechanism 50 is supported by the main pipe 11 that supports the steering wheel Sh. The steering wheel Sh is placed at the nearby location to the driver. Accordingly, placement of the movement mechanism 50 to the nearby location to the steering wheel Sh facilitates the driver to operate the movement mechanism 50.

With reference to FIG. 2, the first abutting members 23 and the second abutting members 24 are formed in the substantially X-shape with reference to a cross section perpendicular to the axial line CL, the torque transmitting portions 31a are each formed in the substantially X-shape that enables an engagement with each first abutting member 23 or each second abutting member 24. This surely enables transmission of torque while allowing movement in the direction of the axial line CL.

The movement mechanism 50 further includes the coupling members 52 which are provided on the movement mechanism body 60 and which are coupled to the outer shaft 30. The coupling members 52 pass completely through the respective elongated holes 11a. When the coupling members 52 abut the edges of the respective elongated holes 11a, the movement of the movement mechanism 50 can be restricted. This causes the outer shaft 30 to have a movable range restricted by the elongated holes 11a. Hence, the outer shaft 30 is prevented from excessively moving by a simple structure.

With reference to FIG. 7, the movement mechanism 50 includes the lock mechanism 70 that prevents relative movement of the inner shaft 20 and the outer shaft 30 in the direction of the axial line CL when the torque transmitting portions 31a abut the respective first abutting members 23 or second abutting members 24. When the steering wheel Sh (see FIG. 3) is turned, the inner shaft 20 and the outer shaft 30 are locked by the lock mechanism 70. This prevents the steering feeling from being changed while the steering wheel Sh is turned.

With reference to FIG. 3, the movement mechanism 50 is connected only to the outer shaft 30. The outer shaft 30 is provided so as to be movable along the axial line CL, and the inner shaft 14 is unable to move along the axial line CL. The inner shaft 14 that supports the steering wheel Sh is designed as unmovable, but only the outer shaft 30 is designed as movable. This enables the steering feeling to be changed without displacing the position of the steering wheel Sh.

Also with reference to FIG. 2, the outer shaft 30 includes the outer shaft groove 32a that is formed in a groove shape across the circumferential direction of the outer circumference, the movement mechanism 50 includes the coupling members 52 which pass through the main pipe 11 so as to face the outer shaft groove 32a, and which can abut the outer shaft groove 32a. Thus, the steering feeling can be changed by a simple mechanism.

With reference to FIG. 4 and FIG. 9, the outer shaft holes 31b are opened in locations adjacent to the respective torque transmitting portions 31a and corresponding to the respective other abutting members (e.g., first abutting members 23 in FIG. 4). Since the outer shaft holes 31b are opened, the respective other abutting members do not abut the outer shaft 30. Hence, the other abutting members cannot transmit torque. Torque transmission between the respective other abutting members and the outer shaft 30 is disabled by a simple structure of opening holes. Such a simple structure enables transmission of the steering torque with the respective one abutting members (e.g., second abutting members 24 in FIG. 4).

As long as the action and effect of the present disclosure are achievable, the present disclosure is not limited to the above embodiment.

INDUSTRIAL APPLICABILITY

The steering device according to the present disclosure is suitable for passenger vehicles.

What is claimed is:

1. A steering device comprising:
a main pipe formed in a cylindrical shape;
an inner shaft which is rotatably supported by the main pipe and which has one end to which a steering wheel is fastened; and
an outer shaft which partially covers the inner shaft and which is rotatable together with the inner shaft,
wherein the inner shaft and the outer shaft are provided so as to be movable relative to each other via a movement mechanism along an axial line,
wherein the inner shaft comprises a first abutting member and a second abutting member which are disposed along the axial line and which have different hardness,
wherein the outer shaft comprises a torque transmitting portion which abuts either the first abutting member or the second abutting member only upon operation given to the movement mechanism, and which is capable of transmitting torque with either the one abutting member only, and wherein the movement mechanism comprises a movement mechanism main body which is provided on the main pipe and which moves along the axial line.

2. The steering device according to claim 1, wherein the movement mechanism comprises a lock mechanism that prevents the relative movement of the inner shaft and the outer shaft in a direction of the axial line when the torque transmitting portion abuts either the first abutting member or the second abutting member.

3. The steering device according to claim 1, wherein an elongated hole opened in an elongated circular shape along the axial line is formed in the main pipe, wherein the movement mechanism further comprises a coupling member which is provided on the movement mechanism main body and which is coupled to the outer shaft, and wherein the coupling member passes completely through the elongated hole.

* * * * *